United States Patent [19]

Vander Molen et al.

[11] 4,285,445

[45] Aug. 25, 1981

[54] CONCENTRATE METERING APPARATUS

[75] Inventors: Gary L. Vander Molen, Waterloo; Timothy A. Brown, Ames, both of Iowa

[73] Assignee: Iowa State University Research Foundation, Inc., Ames, Iowa

[21] Appl. No.: 35,059

[22] Filed: May 1, 1979

[51] Int. Cl.³ .......................... B67D 5/22; B67D 5/60
[52] U.S. Cl. ...................................... 222/49; 222/133; 222/148; 222/152; 222/464; 222/82; 222/83.5; 222/325; 222/481.5; 222/630
[58] Field of Search ..................... 222/81, 82, 83, 83.5, 222/85, 86, 88, 152, 464, 630, 47, 49, 325, 148, 133, 481.5

[56] References Cited

U.S. PATENT DOCUMENTS

| 2,161,048 | 6/1939 | Horstman | 222/82 |
| 2,488,959 | 11/1949 | Burbidge et al. | 222/81 |
| 2,792,969 | 5/1957 | Anderson | 222/88 X |
| 3,184,107 | 5/1965 | Kohanzo | 222/49 |
| 3,240,392 | 3/1966 | Nicko | 222/82 |
| 3,665,981 | 5/1972 | Trebblen | 222/83.5 |

Primary Examiner—Allen N. Knowles
Attorney, Agent, or Firm—Tilton, Fallon, Lungmus & Chestnut

[57] ABSTRACT

An apparatus is disclosed for removing toxic liquid concentrates from their shipping and/or storage containers, mixing selected amounts of such concentrates with water, and rinsing the containers when they are empty, in a manner that avoids exposure of users to such concentrates.

26 Claims, 4 Drawing Figures

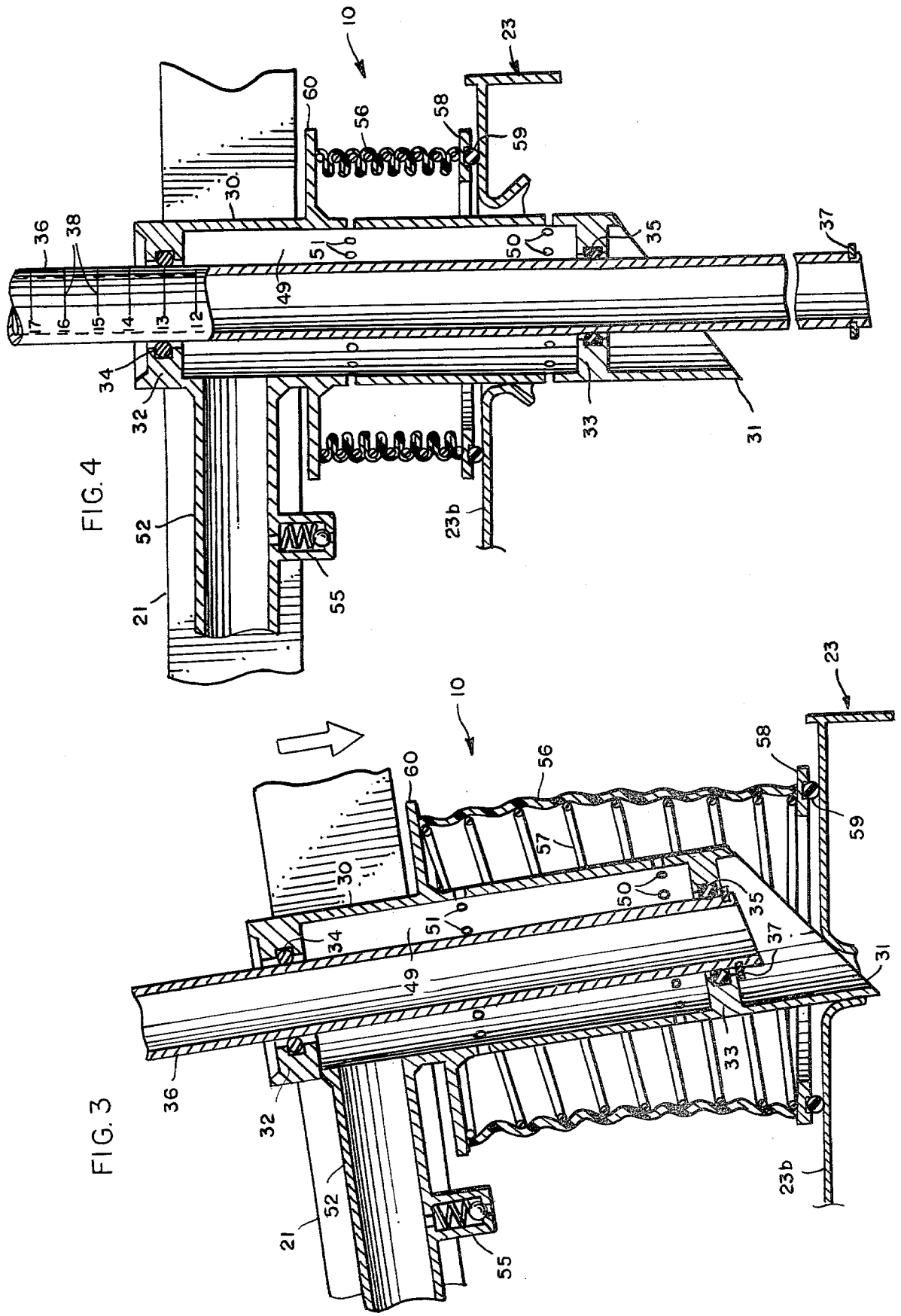

CONCENTRATE METERING APPARATUS

BACKGROUND AND SUMMARY

Pesticide concentrates and other highly toxic liquid concentrates are commonly shipped to farmers and other users in metal containers of five gallons or more capacity. The users then mix such concentrates with relatively large quantities of water (dilutions of 1000 to 1 or more are common) for application as required. It is in the opening and handling of such containers in connection with the diluting procedure that risks are especially great. Splashing of the concentrate during an opening or pouring procedure, spilling of the contents during handling of an opened container, and contacting residual concentrate in or upon the surface of a discarded container, present serious risks not only for users but also for others who might touch such containers (e.g., children, trash collectors, pets, wildlife, etc.). While experienced users generally wear protective clothing while opening and handling such containers, the use of such clothing is often inconvenient and uncomfortable and presents additional risks because direct contact with concentrate clinging to such garments may readily occur as the clothing is put on or taken off, or otherwise handled as, for example, in laundering operations.

Even where extreme precautions are taken to avoid skin contact with the highly toxic liquid concentrates, significant dangers may still exist in the form of vapors which escape after the containers are opened and especially when their contents are poured into tanks containing water for dilution. Finally, it is believed that errors in following the directions on such containers and, in particular, in mixing the concentrates to produce the wrong dilutions, present additional risks, especially if the final solutions are of excessive strength.

Accordingly, it is an object of this invention to provide an apparatus which allows a liquid pesticide concentrate or other toxic concentrate to be removed from its shipping container and transferred to an applicator tank in such a way that the user and others are protected against exposure to such concentrate, including the vapors thereof and the rinse solutions which result when such a container is flushed with water.

Another object is to provide an apparatus which may be easily and safely manipulated to pierce the wall of a concentrate container, extract a selected and accurately measured amount of such concentrate for automatic mixing with water and, when the container is empty, flush the inside surfaces of that container as well as surfaces of the apparatus exposed to such concentrate, so that the emptied container may be safely handled and discarded. A still further object is to provide an apparatus which protects the user even if some of the toxic contents of a container should spray or otherwise escape as a discharge opening is formed in the container wall.

Briefly, the apparatus takes the form of a supporting frame for a conventional pesticide concentrate container, a top member hingedly connected to the frame for movement between raised and lowered positions, a piercing tube mounted upon the top member for piercing a wall of the pesticide container as the hinged top member is swung into its lowered position, an elongated suction tube telescopingly carried by the piercing tube for movement between a retracted position (wherein its lower end is concealed within the piercing tube) and any of a plurality of extended positions (wherein the lower end of the suction tube is extended into a container to withdraw a desired amount of pesticide concentrate therefrom). The suction tube is provided with indicia means so that a user may easily adjust the position of the suction tube to withdraw a measured amount of concentrate from a pierced container. Thus, the suction tube performs the multiple functions of serving as the concentrate extracting tube, indicating to the user the amount of concentrate that will be withdrawn, and automatically limiting such withdrawal to the indicated amount.

An automatically-expandable shroud extends about the lower end portion of the piercing tube so as to contact the wall of a concentrate container just prior to a piercing step, and to remain in contact with such wall throughout the piercing, extracting and flushing operations. The shroud, piercing tube, and suction tube are so dimensioned and interrelated that all surfaces coming in contact with concentrate during such operations, and the interior surfaces of the emptied container, may be thoroughly rinsed with water before the hinged top member is raised to release the container.

Other features, objects, and advantages of the apparatus will become apparent from the specification and drawings.

DRAWINGS

FIG. 3 is an enlarged vertical sectional view illustrating the hinged top member as it is being swung into its lowered position to pierce the wall of a container.

FIG. 4 is a vertical sectional view similar to FIG. 3 but showing the top member in its lowered position and illustrating the suction tube positioned for liquid extraction.

DETAILED DESCRIPTION

Figure 1:
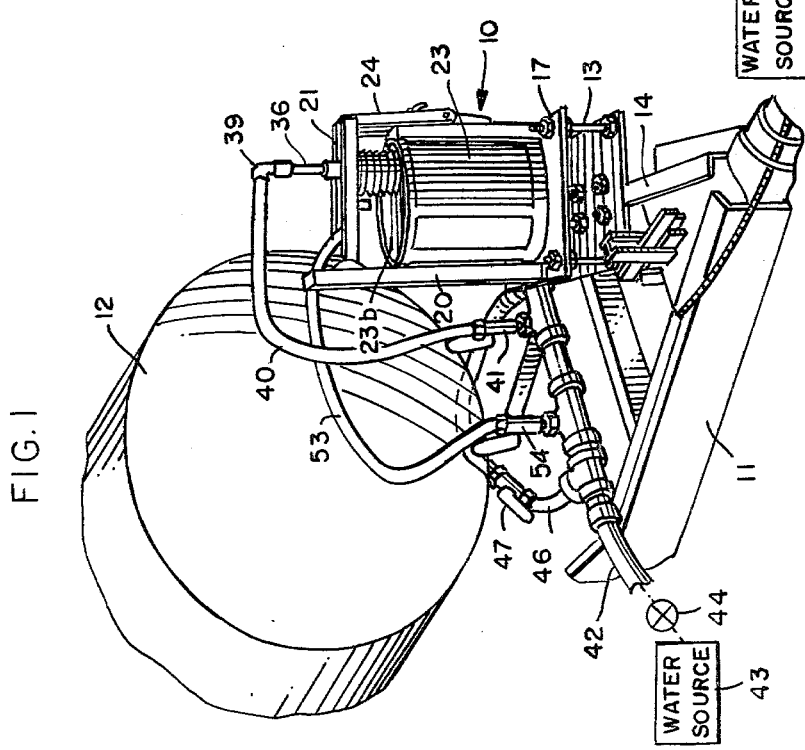
FIG. 1 is a fragmentary perspective view of a trailer equipped with an apparatus embodying the invention.

Referring to FIG. 1, the numeral 10 generally designates a liquid concentrate metering apparatus mounted on the bed 11 of a trailer equipped with a large applicator tank 12. While the apparatus may be conveniently mounted upon the trailer or other vehicle which carries the applicator tank and spray equipment, it is to be understood that the apparatus might instead be supported upon its own vehicle or stand to suit the requirements or preferences of users. Alternatively, tank 12 may serve as a fresh water source with the diluted concentrate flowing either to another tank or directly to an applicator (not shown). FIG. 1 is presented simply to show what is believed to be one particularly convenient arrangement, especially for agricultural operations.

Figure 2:
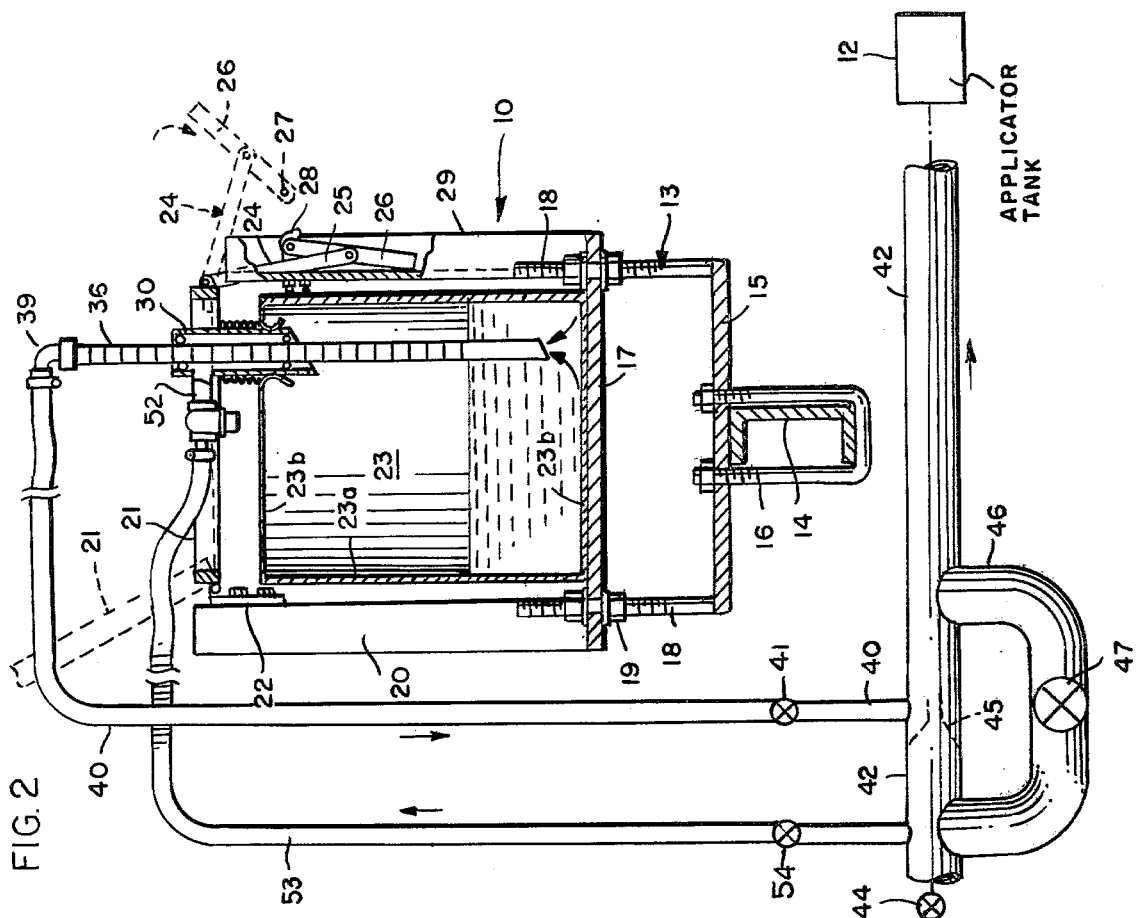
FIG. 2 is a side elevational view, shown partly in section and partly in schematic form, of the apparatus.

The structural and functional relationships are best shown in FIG. 2 where it will be seen that the apparatus 10 includes a support frame assembly 13 secured to member 14 of the trailer. The frame assembly includes a base member 15 which rests upon frame member 14 and is secured thereto by U-bolts 16. A leveling platform 17 is also part of the frame assembly and is carried by upstanding threaded studs 18, or by any other conventional leveling means, secured to base member 15. By adjusting supporting nuts 19, the corners of the platform may be raised or lowered until proper leveling is achieved.

The frame assembly also includes a standard 20 which is secured at its lower end to platform 17. A top member 21 is connected by hinge 22 to the upper end of the standard and is pivotally movable between the raised position indicated by broken lines and the lowered position represented by solid lines. In its lowered position, the hinged top member is generally horizontal and is disposed directly above platform 17 and a conventional shipping container 23 supported by the platform.

The shipping container is ordinarily (but not necessarily) of generally cylindrical configuration, having a side wall 23a and end walls 23b. Where the container is provided with a handle and/or a bung at one end (not shown), it is often convenient to invert the container so that the upwardly-facing end wall is relatively smooth and, consequently, the container need not be rotated or maneuvered upon the platform to expose a clear zone of the top surface for the piercing, extracting, and flushing operations.

Top member 21 is also equipped with a handle assembly 24 which is composed of two elements, namely, a connecting element 25 and a handle lever 26. The connecting element or link is pivotally joined to the free end of top member 21 and, at its opposite end, is pivotally connected to an intermediate portion of handle lever 26. It is believed apparent that in a piercing and locking operation, the handle 24 is swung downwardly from the position depicted in broken lines until a cross pin 27 of the handle lever is received beneath the latch hook 28 projecting from upstanding frame member 29. Further downward pivotal movement of the free end of handle lever 26 exerts a downward force of considerable mechanical advantage upon top member 21 until the handle lever 26 swings past a center point into the self-locking position shown in solid lines (FIG. 2). Since the force-multiplying and self-locking action of such a handle assembly is quite conventional and well known, further description is believed unnecessary herein.

Referring to FIGS. 3 and 4, it will be seen that a piercing tube 30 is secured to top member 21 and projects downwardly therefrom when the top member is in its lowered position. The lower end of the piercing tube is beveled to define an angled piercing tip 31. It will be noted that the angle of the bevel is such that the extreme lower end of the piercing tip is located closest to the pivot axis of top member 21, thereby promoting the piercing and infolding action of the tip and lower edge of the tube when the piercing tube engages the end 23b of a container as illustrated in FIGS. 3 and 4.

The piercing tube 30 has a pair of spaced annular end walls 32 and 33 which are channeled to support resilient sealing rings 34 and 35. A concentric suction tube 36 extends through the openings of the sealing rings and snugly engages the rings in a manner which not only results in a fluid-tight seal but also serves to hold the rigid, elongated suction tube in any selected position of adjustment relative to the piercing tube 30. In FIG. 3, the suction tube 36 is shown in a fully raised or retracted position with retaining ring 37 (which is secured to the lower end of the tube and serves as a stop element) engaging the underside of end wall 33 of the piercing tube. When the suction tube is so retracted, its lower end is elevated above the beveled edge of tip 31 and is therefore concealed within the lower end portion of the piercing tube. After a container-piercing operation has taken place, the suction tube 36 may be telescopically lowered or extended into any selected position as indicated in FIG. 4. The outer surface of the elongated suction tube is provided with indicia means in the form of calibration marks and numerals 38 which, when aligned with the top edge of the piercing tube 30, indicates the volume of concentrate the suction tube is positioned to withdrawal from a pierced container 23, although it is to be understood that if desired the indicia means on the suction tube may take the form of a pointer and the calibrations may appear on a suitable scale secured to the top member.

The upper end of the suction tube is connected by a suitable fitting 39 to a flexible conduit or hose 40 (FIGS. 1 and 2) leading to a valve 41 and a main water supply line 42. Line 42 carries fresh water from any available source 43 of water under pressure. A control valve 44 is interposed along line 42, a suction device in the form of a venturi or flow nozzle 45 is disposed in line 42 adjacent the branch point of suction line 40, and a bypass line 46 equipped with valve 47 may be provided to shunt water about the suction device during certain operations to be described. As illustrated in FIG. 2, line 42 discharges into the applicator tank 12.

Looking to FIGS. 3 and 4, it will be seen that the inside diameter of piercing tube 30 is substantially larger than the outside diameter of suction tube 36, with the result that an annular space or chamber 49 is formed therebetween. Such chamber is delimited at its ends by end walls 32 and 33 of the piercing tube and by the sealing rings 34 and 35 carried by those end walls. Near lower end wall 33, the piercing tube is provided with an annular series of circumferentially spaced openings 50. A similar series of circumferentially spaced openings 51 is provided at approximately the longitudinal mid point between the upper and lower end walls 32 and 33. Above openings 51, a rinsing tube 52 communicates with the piercing tube for conducting rinse water to chamber 49 for discharge through openings 50 and 51. Tube 52 connects to hose 53 which is equipped with valve 54 and which connects to the water line 42 at a point upstream of venturi 45 (FIG. 2).

Tube 52 is provided with an air-inletting check valve 55 which allows air to enter chamber 49 and container 23 (through ports 50 and 51) to replace concentrate as it is withdrawn from the container.

A tubular shroud or sleeve 56 extends about the lower portion of the piercing tube below top member 21 as depicted in FIGS. 3 and 4. The shroud is formed of flexible material (such as synthetic rubber) and has a helical spring 57 embedded therein, causing the tubular shroud or sleeve to expand into a normally fully extended condition in which its lower end is disposed slightly below the extreme end of tip 31. A rigid collar 58, equipped with a resilient annular seal 59 for sealingly engaging the upper surface of the end wall of container 23 in the manner indicated in FIG. 3, is provided at the lower end of the tubular shroud. While depicted as an assembly, elements 56, 57, 58, and 59 might instead be an integral unit. At its upper end, the shroud is securely connected to the piercing tube by annular wall 60.

In the operation of the apparatus, a user first places a concentrate container 23 upon platform 17 and then lowers and locks the top member 21 by means of handle assembly 24. As the top member is lowered, the spring-loaded annular shroud 56 contacts the top wall 23b of the container to provide a seal and to deflect and redirect any concentrate that may be exuded during piercing of the container. As the top member approaches its fully lowered position, and after the shroud has engaged container 23, the tip 31 of the piercing tube punctures end wall 23b of the container in the manner depicted in FIG. 3. Continued downward movement of the top member into its fully locked position results in complete entry of the tip portion of the piercing tube as shown in FIG. 4.

With the top member in its lowered and locked position, the user lowers the suction tube 36 into any selected position for the withdrawal of an amount of liquid concentrate represented by the calibration marking 38 aligned with the upper end of the piercing tube. To this point, all of the valves 41, 44, 47, and 54 have remained closed; now valves 44 and 41 are opened to allow water under pressure to flow from source 43 to applicator tank 12 and to aspirate concentrate through the suction line 40. The liquid concentrate continues to be drawn from the container 23 until the level of concentrate has descended to the lower end of suction tube 36, at which time the suction tube is automatically cleared. Such clearing of the tube is audibly signaled by a sudden increase in air flow through the orifice of check valve 55. The user then closes suction valve 41 and opens bypass valve 47 to speed up the filling of mix tank 12 with water. Thereafter, the bypass valve and supply valves 47 and 44 are closed.

The diluted chemical in applicator tank 12 is then sprayed or applied in the desired manner until the applicator tank has been emptied. The above steps may then be repeated, each time the suction tube 36 being lowered into a new position in order to draw off an additional measured amount of concentrate for mixing with water in tank 12. In the final withdrawal stage, the suction tube 36 is lowered until its lower end contacts the bottom inside wall of the container. Concentrate is therefore drawn from the container until only a small amount remains as a film on the inside bottom and side walls of the container. When concentrate stops flowing through suction line 40, the user opens rinse valve 54. With bypass valve 47 remaining closed, fresh rinse water flows through line 53 into the chamber 49 of the piercing tube 30, flushing the inside surfaces of that tube and a portion of the outside surface of suction 36. Such rinse water is discharged through openings 50 and 51 to spray and flush the inside surfaces of the shroud 56, the outer surfaces of the piercing tube, the top surface of container 23 within the line of contact defined by shroud seal 59, and the inside surfaces of the container 23, and is then withdrawn from the bottom of the container by suction tube 36 and line 40. The flow of rinse water is continued until the surfaces previously in contact with the concentrate have been thoroughly rinsed. Thereafter, with both the rinse valve 54 and suction valve 41 closed, and with bypass valve 47 opened, the user fills the applicator tank to the desired level. The fully rinsed container is removed from the apparatus by simply lifting the suction tube 36, releasing handle assembly 25, and lifting top member 21.

It is to be noted that during the rinsing operation not only are the interior surfaces and certain exterior surfaces of the container flushed by rinse water, but that those elements of the apparatus 10 in direct contact with the pesticide concentrate are also flushed or rinsed. The apparatus therefore provides a relatively safe procedure for opening the containers of toxic liquids, removing selected volumes of such liquids for dilution with water, and finally rinsing the emptied containers with clear water so that such containers may be more safely handled and discarded.

While in the foregoing we have disclosed an embodiment of the invention in considerable detail for purposes of illustration, it will be understood by those skilled in the art that many of these details may be varied without departing from the spirit and scope of the invention.

We claim:

1. An apparatus for removing liquid concentrates from their shipping/storage containers and for mixing such concentrates with water, such containers having side and end walls, comprising a support frame for supporting a concentrate container with one end wall thereof facing upwardly, a top member movably mounted on said support frame for movement between raised and lowered positions, a piercing tube mounted upon said top member having a piercing tip adapted to engage an upwardly facing end wall of a concentrate container supported by said frame for piercing a hole in such end wall as said member is moved from its raised to its lowered positions, a rigid elongated suction tube having upper and lower ends and being telescopingly carried by said piercing tube for movement between a retracted position wherein said lower end is disposed within said piercing tube and any of a plurality of extended positions wherein said lower end is spaced selected distances below said piercing tip, conduit means connected to the upper end of said suction tube for carrying the contents of a container supported by said frame to a water supply line, and a water supply line communicating with said conduit, said supply line including suction means for creating a suction in said conduit means and in said suction tube when water flows through said line.

2. An apparatus for removing liquid concentrates from their shipping/storage containers and for mixing such concentrates with water, such containers having side and end walls, comprising a support frame for supporting a concentrate container with one end wall thereof facing upwardly, a top member movably mounted on said support frame for movement between raised and lowered positions, a piercing tube mounted upon said top member having a piercing tip adapted to engage an upwardly facing end wall of a concentrate container supported by said frame for piercing a hole in such end wall as said member is moved from its raised to its lowered positions, a rigid elongated suction tube having upper and lower ends and being telescopingly carried by said piercing tube for movement between a retracted position wherein said lower end is disposed within said piercing tube and any of a plurality of extended positions wherein said lower end is spaced selected distances below said piercing tip, said piercing tube including spaced annular end walls sealingly but slidably engaging said suction tube, said piercing tube having an inside diameter substantially larger than the outside diameter of said suction tube to define an annular chamber therebetween, and a rinsing tube being connected to said piercing tube and communicating with said annular chamber for conducting rinsing fluid thereto.

3. The apparatus of claim 2 in which said piercing tube has lateral openings intermediate the end walls thereof for the discharge of rinsing fluid.

4. The apparatus of claim 3 in which at least some of said openings are arranged in a circumferentially-spaced series adjacent the end wall of said piercing tube nearest said tip.

5. The appartaus of claim 4 in which said openings adjacent said end wall nearest said tip are positioned and arranged to introduce air into a container as concentrate is removed therefrom, and air inlet means for inletting air into said chamber and thence into a concentrate container during a concentrate-removal operation.

6. An apparatus for removing liquid concentrates from their shipping/storage containers and for mixing such concentrates with water, such containers having side and end walls, comprising a support frame for supporting a concentrate container with one end wall thereof facing upwardly, a top member movably mounted on said support frame for movement between raised and lowered positions, a piercing tube mounted upon said top member having a piercing tip adapted to engage an upwardly facing end wall of a concentrate container supported by said frame for piercing a hole in such end wall as said member is moved from its raised to its lowered positions, a rigid elongated suction tube having upper and lower ends and being telescopingly carried by said piercing tube for movement between a retracted position wherein said lower end is disposed within said piercing tube and any of a plurality of extended positions wherein said lower end is spaced selected distances below said piercing tip, and a resilient tubular shroud surrounding a lower portion of said piercing tube, said shroud having an upper end affixed to said tube and a free lower end adapted to engage a concentrate container supported by said support frame, said tubular shroud being longitudinally expandable and contractable, and spring means urging said shroud into its expanded condition.

7. The apparatus of claim 6 in which said tubular shroud has a diameter substantially larger than said piercing tube.

8. An apparatus for removing toxic liquid concentrates from their shipping/storage containers and for mixing such concentrates with water, such containers having side and end walls, comprising a support frame for supporting a concentrate container with one end wall thereof facing upwardly, a top member hingedly connected to said support frame for pivotal movement between a raised position and a substantially horizontal lowered position, a piercing tube mounted upon said top member having a piercing tip adapted to engage an upwardly facing end wall of a concentrate container supported by said frame for piercing a hole in such end wall as said member is pivoted into its lowered position, an elongated suction tube having upper and lower ends and being telescopingly carried by said piercing tube for movement between a retracted position wherein said lower end is disposed within said piercing tube and any of a plurality of extended positions wherein said lower end is spaced selected distances below said piercing tip, said suction tube having indicia means associated therewith for indicating the position of adjustment of said suction tube relative to said piercing tube, and a resilient tubular shroud surrounding a lower portion of said piercing tube, said shroud being longitudinally expandable and contractable, and having a lower end extending below the tip of said piercing tube when said shroud is expanded, and spring means urging said shroud into its expanded condition.

9. The apparatus of claim 8 in which conduit means is connected to the upper end of said suction tube for carrying the contents of a container supported by said support frame to a water supply line.

10. The apparatus of claim 9 in which a water supply line communicates with said conduit, said supply line including suction means for creating a suction in said conduit means and suction tube when water flows through said line.

11. The apparatus of claim 8 in which said piercing tube includes spaced annular end walls sealingly but slidably engaging said suction tube.

12. The apparatus of claim 11 in which said piercing tube has an inside diameter substantially larger than the outside diameter of said suction tube to define an annular chamber therebetween.

13. The apparatus of claim 12 in which a rinsing tube is connected to said piercing tube and communicates with said annular chamber for conducting rinsing fluid thereto.

14. The apparatus of claim 13 in which said piercing tube has lateral openings intermediate the end walls thereof for the discharge of rinsing liquid.

15. The apparatus of claim 14 in which at least some of said openings are arranged in a circumferentially-spaced series adjacent the end wall of said piercing tube nearest said piercing tip.

16. The apparatus of claim 15 in which said openings adjacent said end wall nearest said tip are positioned and arranged to introduce air into a container as liquid concentrate is removed therefrom, and air inlet means for inletting air into said chamber and thence into a pesticide container during a concentrate-removal operation.

17. The apparatus of claim 11 in which said end walls of said piercing tube include resilient sealing rings slidably and sealingly engaging the outer surface of said suction tube.

18. The apparatus of claim 8 in which a concentrate container having side and end walls is supported upon said support frame.

19. The apparatus of claim 8 in which said top member and said support frame are provided with locking means for releasably securing said hinged top member in said substantially horizontal lowered position.

20. An apparatus for removing liquid concentrates from their shipping/storage containers and for mixing such concentrates with water, said containers having side and end walls, comprising a support frame for supporting a concentrate container with one end wall thereof facing upwardly, a top member movable relative to said support frame and equipped with a piercing tube having a piercing tip adapted to engage an upwardly facing end wall of a concentrate container supported by said frame for piercing a hole in such end wall as said member and support frame are moved towards each other, and a rigid elongated suction tube having upper and lower ends and being telescopingly carried by said piercing tube for movement between a retracted position wherein said lower end is disposed within said piercing tube and any of a plurality of extended positions wherein said lower end is spaced selected distances below said piercing tip.

21. The apparatus of claim 20 in which said suction tube has indicia means associated therewith for visually indicating the position of adjustment thereof.

22. The apparatus of claim 21 in which said indicia means includes calibration marks upon the outer surface of said suction tube.

23. The apparatus of claim 20 in which conduit means is connected to the upper end of said suction tube for carrying the contents of a container supported by said frame to a water supply line.

24. An apparatus for removing liquid concentrates from their shipping/storage containers and for mixing such concentrates with water, said containers having side and end walls, comprising a support frame for supporting a concentrate container with one end wall thereof facing upwardly, a top member movable relative to said support frame and equipped with a piercing tube having a piercing tip adapted to engage an upwardly facing end wall of a concentrate container supported by said frame for piercing a hole in such end wall as said member and support frame are moved towards each other, a rigid elongated suction tube having upper and lower ends and being telescopingly carried by said piercing tube for movement between a retracted position wherein said lower end is disposed within said piercing tube and any of a plurality of extended positions wherein said lower end is spaced selected distances below said piercing tip, conduit means connected to the upper end of said suction tube for carrying the contents of a container supported by said frame to a water supply line, and a water supply line communicating with said conduit, said supply line including suction means for creating a suction in said conduit means and in said suction tube when water flows through said line.

25. An apparatus for removing liquid concentrates from their shipping/storage containers and for mixing such concentrates with water, said containers having side and end walls, comprising a support frame for supporting a concentrate container with one end wall thereof facing upwardly, a top member movable relative to said support frame and equipped with a piercing tube having a piercing tip adapted to engage an upwardly facing end wall of a concentrate container supported by said frame for piercing a hole in such end wall as said member and support frame are moved towards each other, a rigid elongated suction tube having upper and lower ends and being telescopingly carried by said piercing tube for movement between a retracted position wherein said lower end is disposed within said piercing tube and any of a plurality of extended positions wherein said lower end is spaced selected distances below said piercing tip, said piercing tube including spaced annular end walls sealingly but slidably engaging said suction tube, said piercing tube having an inside diameter substantially larger than the outside diameter of said suction tube to define an annular chamber therebetween, and a rinsing tube connected to said piercing tube and communicating with said annular chamber for conducting rinsing fluid thereto.

26. The apparatus of claim 25 in which said piercing tube has lateral openings intermediate the end walls thereof for the discharge of rinsing fluid.

* * * * *